March 17, 1942.   F. CONRAD ET AL   2,276,647
MANUFACTURE OF COPPER-OXIDE RECTIFIERS
Filed Dec. 22, 1938   2 Sheets-Sheet 1

WITNESSES:
C. J. Weller.
Nw. C. Groome

INVENTORS
Frank Conrad, Earl D. Wilson,
Carl C. Hein and Floyd T. Hague.
BY O. B. Buchanan
ATTORNEY March 17, 1942. F. CONRAD ET AL 2,276,647
MANUFACTURE OF COPPER-OXIDE RECTIFIERS
Filed Dec. 22, 1938 2 Sheets-Sheet 2

WITNESSES:
C. J. Weller
Thw. C. Groome

INVENTORS
Frank Conrad, Earl D. Wilson,
Carl C. Hein and Floyd T. Hague.
BY O. B. Buchanan
ATTORNEY Patented Mar. 17, 1942

2,276,647

UNITED STATES PATENT OFFICE 2,276,647

MANUFACTURE OF COPPER-OXIDE RECTIFIERS

Frank Conrad and Earl D. Wilson, Wilkinsburg, Carl C. Hein, Forest Hills, and Floyd T. Hague, Drexel Hill, Pa., assignors to Westinghouse Electric & Manufacturing Company, East Pittsburgh, Pa., a corporation of Pennsylvania Application December 22, 1938, Serial No. 247,198

28 Claims. (Cl. 175—366)

Our invention relates to methods of, and apparatus for, manufacturing copper-oxide rectifiers, and particularly for preparing and treating the oxidized copper electrodes thereof.

The general object of our invention is to provide such improved methods and apparatus as shall result in rectifiers having about twice as high a ratio of reverse-current resistance to forward-current resistance as was previously possible, while at the same time very considerably reducing the number of defective electrodes which are produced during the manufacturing operation, thus resulting in a much superior and much cheaper product.

Our improvements include the conditioning of the air in the furnace room and in the oxidizing furnace itself, the furnishing of a controlled supply of air to the oxidizing furnace in generous quantities much more than barely sufficient to supply the oxygen-requirements for oxidizing the copper plates, (meaning suitably oxidizing the surface of the plates), the preheating of such controlled air-supply before the same is brought into contact with the plates undergoing treatment in the oxidizing furnace and the consequent operation of the oxidizing furnace at a somewhat higher temperature than usual, the utilization of a water jacket or equivalent in the intermediate-temperature chamber where the temperature of the oxidized plates is brought down to a suitable temperature from which the plates should be quenched, the utilization of a recirculating system for bathing the plates in copious quantities of recirculated air in the intermediate-temperature chamber, the control of the temperature of the re-circulated air in the intermediate temperature chamber, the provision of a continuous process machine having a conveyor for carrying the plates from the oxidizing chamber directly into the intermediate-temperature chamber and thence directly into the quenching chamber under conditions which are altogether controllable and reproducible, and special methods in the selection, cleansing and preparation of the raw sheet-copper electrode-material before it is placed in the oxidizing chamber, and in the preparation of the oxidized plates after they have left the quenching chamber.

With the foregoing and other objects in view, our invention consists in the methods, systems, apparatus and products hereinafter described and claimed, and illustrated in the accompanying drawings wherein:

Figure 8:
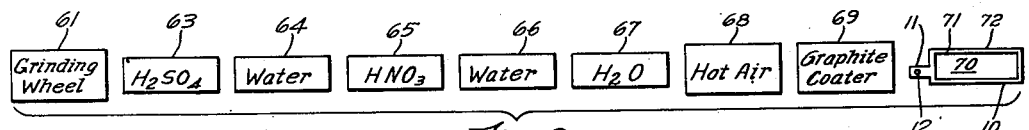
Figure 9:
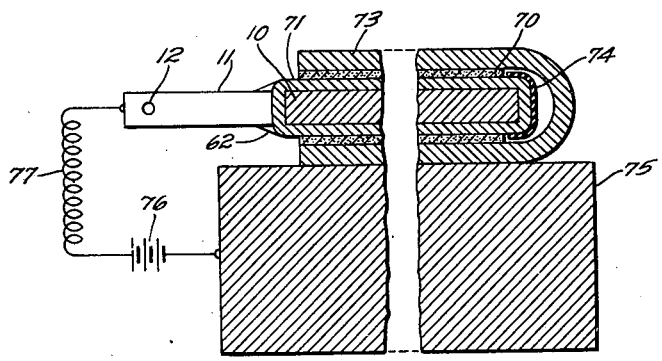

Fig. 8 is a diagrammatic view illustrating successive steps in the treatment in the oxidized plates after leaving the quenching chamber, and Fig. 9 is a very much enlarged cross-sectional view through a portion of an assembled rectifier, with the thinner parts somewhat exaggerated in their relative thickness for the purpose of illustration, and including a diagrammatic view of a circuit in which the rectifier may be utilized.

In the economical manufacture of copper-oxide rectifiers on a commercial scale, the important considerations are to obtain as high a percentage as possible, of oxidized electrodes which will pass certain minimum specifications regarding the ratio of resistances in the reverse and forward directions, that is, in the supposedly non-conducting and conducting directions, and it is obviously desirable that those minimum specifications shall be set at a figure which is as high as possible without prohibitively increasing the amount of scrap material resulting from finished electrodes which fail to meet the required specifications.

The first step in the production of oxidized copper electrodes of uniformly good quality is the selection of a grade of copper which is found, from experiment, to be capable of giving a high ratio of reverse to forward resistances. So far, the only grade of copper which is known to produce a satisfactory rectifier in this respect is copper which is obtained from mines high in the Andes mountain-range. Heretofore, this copper has been furnished to the rectifier-manufacturer, by the copper-mill, in what is known as a finish-rolled condition, produced by passing the copper through clean, highly polished rolls, with a minimum amount of oil, after the last annealing operation by the rolling mill.

In our present processes, we have found it better, for reasons which will appear hereinafter, to obtain this Andes copper-sheet from the copper-mills in a form known as mill-annealed, in which no particular precautions are taken in rolling the copper, and after the last rolling operation it is annealed, in order to satisfy ordinary commercial requirements regarding roofing sheet material and the like, and it is given an acid dip to remove the scale and to generally clean up the surface. This is a standardized process of the rolling mills, resulting in a comparatively cheap form of copper, since no particular or unusual instruments or precautions are required at the mill. For our purposes, the last annealing operation and acid-dip operation at the mill are probably unnecessary, but there is some advantage in the acid dip by the mill in facilitating the inspection of the copper before it is utilized in the preparation of oxidized copper electrodes for rectifiers.

We have found it advantageous to utilize the utmost precautions in regard to cleanliness, in the handling and storing of the copper, even to the extent of furnishing the workmen with gloves with which to handle the sheet-copper in all of its stages after being received from the rolling mill. We have found that certain oils from the workmen's hands are not absolutely removed by the cleansing processes which are commonly utilized for cleaning the copper, resulting in inferior oxidized electrodes.

Figure 1:
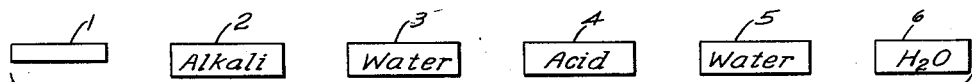
Figures 1 to 4 are diagrammatic views illustrating successive steps in the preparation of the raw sheet-copper electrode-material before subjecting the same to the oxidizing treatment.

The sheets of copper, as received from the copper-mill, are stored until time for immediate use. They are then taken from the storage room and subjected to some or all of the series of operations which are hereinafter described and illustrated in Figs. 1 to 9 of the drawings. Such a sheet of copper is indicated at 1 in Fig. 1.

The first step in the process is a dip in a tank 2 containing a caustic alkaline solution, to remove grease, after which the sheet is rinsed in water 3 and dipped in an acid solution 4 to remove any traces of oxide, after which it is rinsed in water 5 to remove the acid.

Heretofore, ordinary tap-water was utilized in this process, but according to our present method we prefer, after the preliminary rinse in cold water 5, to rinse the sheet in a tank 6 containing distilled water, indicated on the drawings as H₂O, preferably heated. By utilizing distilled water, we avoid the residual deposit which was previously obtained on the copper in the form of salts which are present in ordinary water, largely as calcium, magnesium and iron sulphates. The final wash in distilled water removes these deposits, leaving the copper surface with a bright copper color which is a noticeable improvement in the appearance of the plates after they dry off, as compared to the appearance obtained by washing in ordinary water and simply letting them drain.

The above-described mill-annealed copper has given results which are in general equal or superior to those obtained with the more costly highly polished copper previously purchased from the copper mills. In a certain percentage of the completed oxidized plates, there have been discovered so-called non-rectifying points, evidently resulting from a small flaw in the oxide, causing the rectifier to be a good conductor in both directions at these points.

Figure 2:
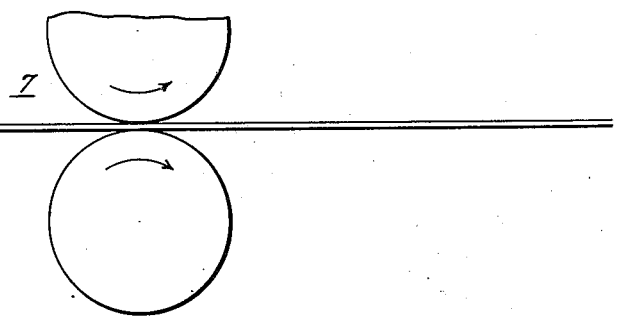

After some experimentation, we found that we could reduce the number of non-rectifying points practically to the vanishing point, by rerolling the sheet, as indicated at 7 in Fig. 2, after the above-described cleansing operation so as to slightly reduce the thickness of the copper, say from 32 mils to 25 mils. The effect of this light, rerolling operation is apparently to smooth out the flaws left by the attacks of the dipping acids.

Of course, it would be theoretically possible to obtain copper from the copper-mills, with the same condition as to surface as is obtained after this rerolling operation, but, in actual practice, we have found that better results are obtained if the copper is prepared as above described, and is given the re-rolling operation immediately before being utilized in the manufacture of copper-oxide rectifiers.

Figure 3:
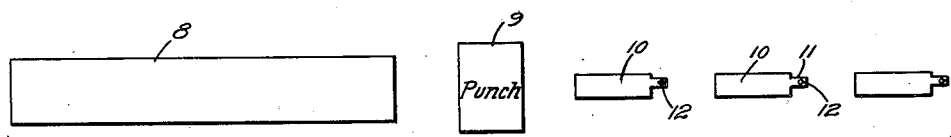

As illustrated in Fig. 3, a rerolled copper sheet 8, prepared as above described, is next fed into a punching machine 9, which cuts out electrode-blanks 10 in the final formed designed, the illustrated form consisting of an oblong plate having a terminal tab or lug 11 thereon, with one or more holes 12 punched in the tab.

Figure 4:
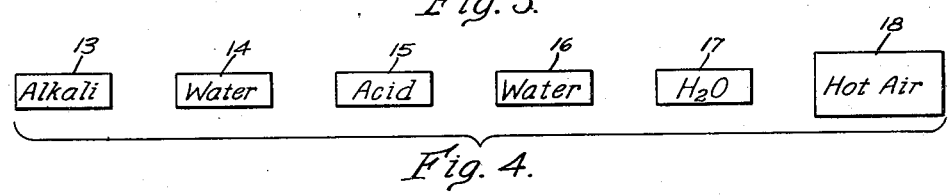

As shown in Fig. 4, the electrode-blanks 10 are next given an alkali dip 13, in caustic lye, followed by water 14, and an acid dip 15 which is made as brief as possible in order to avoid pitting of the copper surface. This acid dip is followed by the usual rinse in cold water 16, after which, according to our invention, we rinse the blanks with hot distilled water 17 and then place the blanks in a dryer 18 where they are dried in a hot air blast.

Figure 5:
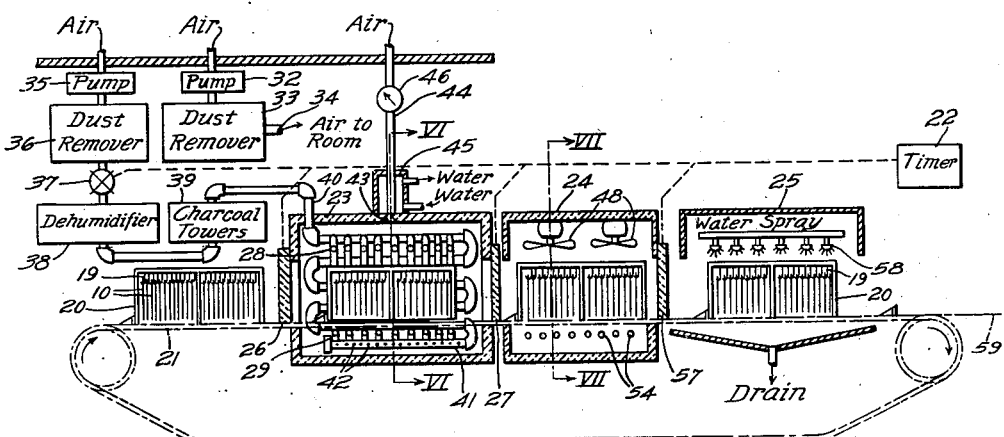
Fig. 5 is a somewhat diagrammatic longitudinal sectional view illustrating a complete oxidizing apparatus including an oxidizing chamber, an intermediate-temperature chamber and a quenching chamber, with a suitable conveyor system and suitable air-treatment system.

As soon as possible after the distilled-water rinse 17 and the drying 18, the plates are subjected to the oxidizing operation illustrated in Fig. 5. For this purpose, a plurality of plates or blanks 10 are suspended from hooks 19 in an open frame or cage 20, after which one or more of these cages are placed on an endless chain or conveyor 21 which is automatically operated, under the control of a timer 22, to cause the conveyor 21 to momentarily move, at certain time-intervals, for a sufficient distance each time to cause the cages to be fed successively into an oxidizing chamber 23, an intermediate-temperature chamber 24, and a quenching chamber 25.

Figures 6, 7:
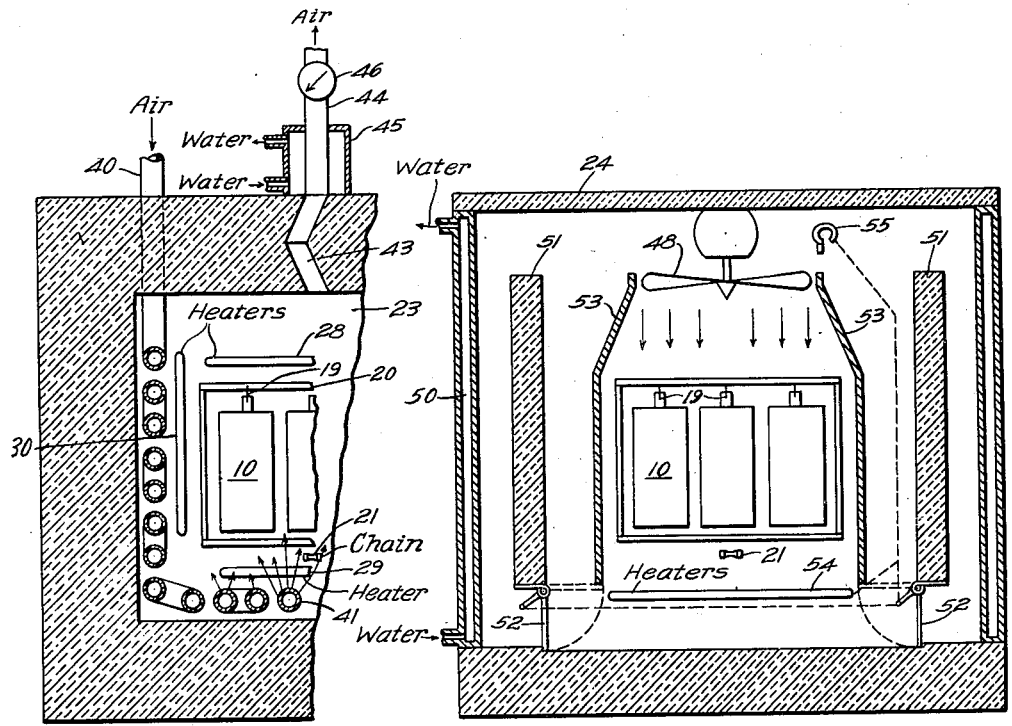
Fig. 6 is a somewhat diagrammatic cross-sectional view through the oxidizing chamber, on approximately the line VI—VI in Fig. 5.
Fig. 7 is a somewhat diagrammatic cross-sectional view through the intermediate-temperature chamber, on approximately the line VII—VII of Fig. 5.

The construction of the oxidizing chamber 23 is shown in Figs. 5 and 6, and certain structural features thereof are claimed in a patent of F. T. Hague, No. 2,201,580, granted May 21, 1940, and assigned to the Westinghouse Electric & Manufacturing Company.

The walls of this oxidizing chamber 23 are made of heat-insulating materials and are provided with front and back doors 26 and 27 which are also operated, under the control of the timer 22, as indicated by dotted lines, the control being such that the doors are normally closed and are only momentarily opened during the time when the endless conveyor 21 is moving. The oxidizing chamber 23 has a top row of heaters 28 therein, which may be electric resistance-rods or the like, a bottom row of heaters 29, and two rows of vertically disposed side-heaters 30, one on each side of the oxidizing chamber 23, so that all of the interior surfaces of the oxidizing chamber have heaters associated therewith except the two ends which are closed by the doors 26 and 27. The respective heaters 28, 29 and 30 are spaced from the respective walls with which they are associated.

Prior to our invention, so far as we are aware the oxidizing furnaces in which copper electrodes have been oxidized, for making copper-oxide rectifiers, have invariably depended upon casual infiltration of air for supplying the oxygen necessary to form the oxide or oxides on the copper. This practice has not only necessitated a considerable curtailment in the number of blanks which are put in a given furnace at any time, so that the furnace is operated with charges consisting of only a small percentage of the number of blanks which it would actually hold, but the resulting oxide coatings have been non-uniform, and in general inconsistent as regards successive charges, apparently resulting from the impoverishment of the oxygen in the air which happened to be within the furnace.

According to our invention, we seek to make the oxide coatings absolutely uniform, not only over all of the oxidizing surfaces of the blanks but over all of the blanks, and in successive charges of the furnace, as long and as often as the furnace is utilized. It is desirable to make the oxide coatings as thin as is feasible, because of the resistance of the red copper-oxide in the finished product. Thus, the thinner the oxide coating, the less will be the resistance in the forward or conducting direction. The thinnest oxide coating which is practically utilizable is one which will have no holes or bare spots in it after the completion of the various subsequent treating operations, as will be described, so that there will be no short-circuited point in the completed rectifier. Thus it follows that it is highly desirable that every portion of the exposed copper surface, in the oxidizing furnace, shall, at every instant, be at nearly the same temperature as every other point, and that it shall at the same time be bathed with a gas having as near as possible the same percentage of available oxygen as at every other point.

It is an important feature of our invention, therefore, to provide a definite, controlled supply of air for the oxidizing chamber 23. Before describing this air-supply for the oxidizing chamber, we shall described, first, some discoveries which we have made respecting the air which is utilized for oxidizing copper electrodes for copper-oxide rectifiers.

We have found that the small, usually disregarded impurities in air have a really enormous effect upon the success of oxidizing operations in the manufacture of copper-oxide rectifiers, and particularly in a plant where other manufacturing operations are in progress, and even in a city, or near a city, where other manufacturing operations are in progress, depending upon the direction of the wind. We have found that sulphur, or sulphur-containing vapors from coal smoke and burnt gases, including hydrogen-sulphide, and organic sulphur are particularly deleterious to the oxidizing process in the manufacture of copper-oxide rectifiers, resulting in many inferior oxidized electrodes of very poor reverse-to-forward resistance-ratios, so that the inferior electrodes have to be discarded. The ordinary sulphur-content of the atmosphere in the Pittsburgh district is about ¼ grain per million cubic feet, but near industrial plants there is frequently as much as 1 grain which will cause severe trouble with copper-oxide rectifiers.

Other atmospheric poisons are particularly deleterious to the oxidizing process in the manufacture of copper-oxide rectifier, apparently operating or acting like plasticizers or diluents of the red copper-oxide coating, such atmospheric poisons including carbon tetrachloride, which is frequently utilized as a polishing and cleaning agent or solvent in industrial plants, benzine, alcohol, insulating varnishes and shellacs, polishing rouge, tobacco smoke, and other substances.

In addition to the foregoing various foreign matters in air, there are also various solid particles, which for convenience we shall refer to as dust-particles, by which term we mean to include both large and small solid particles of any and every composition whatsoever, as carried by ordinary air, such particles forming defective points on the oxidized copper surfaces, resulting in plates which are either partially or altogether defective in their performance in the completed rectifier.

According to our invention, we propose to purify both the air which is utilized in the room in which the furnace is located and the air which is supplied to the oxidizing chamber 23, as illustrated diagrammatically in Fig. 5. As illustrated in Fig. 5, a pump 32 draws in air from the outside and passes it through any suitable dust-remover 33, after which the air is discharged into the furnace-room, as indicated at 34. Any suitable dust-remover 33 may be utilized, a very desirable machine for this purpose being the electrostatic precipitator which is shown and described in Penney Patent 2,129,783, granted September 13, 1938.

As also illustrated in Fig. 5, the air which is supplied to the oxidizing chamber 23 is brought in, from outside of the furnace room, by means of a pump 35 which delivers the air first to a dust-remover 36 which may be similar to the dust-remover 33, and thence, through a valve 37, to a dehumidifier 38. From the dehumidifier, in the particular form of our invention illustrated in Fig. 5, the air passes through charcoal towers 39, from which the completely treated air is led into the air-inlet pipe 40 of the oxidizing chamber 23.

The dehumidifier 38 may be of any desired form. A form of dehumidifier which we at present prefer is a tank or tanks utilizing activated alumina as the active material which brings down the moisture-content of the air to a value corresponding to −30° C. dewpoint, and sometimes to −40° C. dewpoint. We believe that the dehumidifier 38 is desirable because of the acids and other impurities which are carried by the moisture particles in air, even though these moisture particles are apparently in the form of vapor. The condensed liquid which is obtained from the air by the alumina dryer 38 is strongly contaminated with dissolved impurities.

The dehumidifier 38 also reduces the moisture to a value between set or controlled limits, so that a controlled moisture-content is maintained in the oxidizing chamber, regardless of the room-humidity.

Another reason for utilizing the dehumidifier 38 is that the charcoal towers 39 operate more efficiently with dry air than with moist. The charcoal towers contain activated charcoal which is extremely porous. The activated charcoal mechanically removes sulphur vapors, and to a smaller extent other vapors, by condensing and absorbing the same. The charcoal filter 39 reduces the sulphur-content of the air, and the content of other atmospheric poisons, to a satisfactorily low value.

Before the treated air is permitted to come into contact with the copper plates or blanks in the oxidizing chamber 23, this air must be heated substantially to the temperature of the interior of the oxidizing chamber, so that all points on the exposed surfaces of the copper which is undergoing oxidation in this chamber shall be subjected to air at the same high temperature.

High-temperature oxidation produces a favorable type of oxide, whereas low-temperature oxidation (as would be obtained with unheated air) produces an unfavorable black oxide.

As shown in Figs. 5 and 6 the air enters the oxidizing chamber 23 through the air-inlet pipe 40 which then passes back and forth between the side heaters 30 and the side wall of the oxidizing chamber 23, finally passing back and forth along the bottom of the oxidizing chamber 23, below the bottom heaters 29. In this way, the air is brought up substantially to the furnace temperature. Some or all of the bottom air-pipes 41 are provided with series of perforations 42, as indicated in Fig. 5, discharging numerous streamlets of preheated air which rise substantially uniformly in the oxidizing chamber, as indicated by the arrows in Figs. 5 and 6.

The volume of air thus admitted to the oxidizing chamber 23 is considerably more than just sufficient to supply the oxygen-requirements for the copper-oxide layer on the copper electrode-plates in the chamber.

The average rate at which air is required, at the oxidizing temperatures prevailing in the oxidizing chamber, in order to just barely supply the minimum amount of oxygen required for the copper-oxide layer, is something of the order of 1.5 cc. per minute per square centimeter of the exposed copper surface. The actual amount of air admitted should be several times this figure, or say at the rate of a minimum of 5 cc. per minute per square centimeter of copper surface during the time that the copper is being oxidized in the oxidizing chamber, and we prefer to supply at least 8 or 10 times as much oxygen, through the air-supply to the oxidizing chamber, as is deposited on the copper plates.

In the interests of uniformity in the copper-oxide coating, it is desirable that all of the air which bathes all portions of the exposed copper surfaces shall be of approximately the same composition with respect to available oxygen in the air, so that all of the exposed copper surfaces shall build up oxide coatings of the same nature and at the same rate. In order to prevent some portions of the copper surface from being washed with impoverished air from which the oxygen has been largely removed from previous traversal of other portions of the copper surface, it is desirable to have so great an excess-quantity of air passing through the oxidizing chamber, that the average oxygen-to-nitrogen ratio of the air within the oxidizing chamber shall not be reduced to less than 90% of the normal oxygen-to-nitrogen ratio in air, and in extreme cases, probably never less than 80% of this normal ratio, unless something in quality is to be sacrificed, in the finished product.

By supplying, to the oxidizing chamber, a quantity of air which is definitely controllable, by controlling the pump 34 and the valve 37, a positive-pressure supply of air is provided, which not only sweeps out the old vitiated air from the chamber, but also, because of its slight pressure above the outside atmosphere, it prevents the casual and uncontrolled infiltration of air which heretofore was the only source of fresh air in the oxidizing chambers of furnaces previously used in the manufacture of oxidized copper plates. Any leakage, now, is from within to without, rather than vice-versa.

According to our invention, means are provided for permitting the escape of air from the oxidizing chamber 23. As shown in Figs. 5 and 6, the top wall of this chamber has a preferably bent opening 43 therein bent so as not to provide a straight opening which might have a tendency to unduly cool the spot immediately beneath it by reason of heat-radiation. Connected to this opening 43 is an exhaust air-pipe 44 which is preferably surrounded by a water jacket 45, for cooling purposes, immediately after it leaves the chamber 23. Preferably also, the exhaust pipe 44 is provided with a damper 46 which is biased so that it tends normally to return to closed position, but is easily opened when there is any air-pressure tending to cause air to flow outwardly from the oxidizing chamber 23.

By the expedient of bringing the air in, through the pipe 40, and thence through a network of piping lying between the walls of the oxidizing chamber 23 and the heaters 30 and 29, the incoming air is preheated, before it is discharged, through the openings 42, into the space occupied by the exposed copper plates, so that the air enters this space at substantially the oxidizing temperature within the oxidizing chamber.

A very important feature of our invention is that the oxidizing copper plates are not only bathed with a copious supply of air, so that they receive an over-sufficiency of oxygen, at a reasonably constant dilution or strength of oxygen, or oxygen-to-nitrogen ratio, but this air is preheated, before it reaches the plates, so that every portion of the exposed surface of the plates is bathed with air at as nearly as possible the same temperature. The plates are thus heated, and maintained at their elevated temperature, by strong convection currents of preheated air, which is new in the art, as well as by radiant heat from the heaters 28, 29, 30 as in the prior art. We believe that an important advantage of the convection-heating by means of the copious streams of substantially constant-temperature, preheated air is that all portions of the copper plates are more uniformly heated, and maintained at a more uniformly constant temperature, in the oxidizing chamber 23, than was possible heretofore.

We believe that an important advantage of our convection-current heat-control of the temperatures of the various portions of the copper plates in the oxidizing chamber 23, is that local hot spots are avoided, particularly in the top tabs which are engaged by the suspending hooks 19 of the open-work frames or cages 20 which support the copper plates 10 in the oxidizing furnace. This makes it possible to operate the oxidizing furnace at a slightly higher temperature than has heretofore been possible.

There are two reasons for wanting a high temperature within the oxidizing chamber. One is that the oxidizing rate varies with something like the 12th power of the absolute temperature of the copper, so that a high temperature will contribute a faster passage of the plates through the furnace, increasing the daily output of any given furnace.

A second advantage of a high oxidizing temperature, particularly a temperature of the order of 1020° C. or higher, is that the black oxide of copper apparently decomposes at approximately 1020° C., giving up oxygen and forming the red oxide at approximately this temperature. The black oxide must be removed, before the oxidized copper plate is useful for rectifying purposes, as will be subsequently described, and hence it is obviously desirable to minimize the production of the black-oxide coating. We have found that this object is accomplished by very rapidly bringing up the plates to a temperature of the order of 1020° C., or preferably a little higher, 1025° being the temperature which we at present prefer. This minimizes the production of black oxide while the copper plates are being brought up to their full oxidizing temperature, and it also apparently results in some decomposition of the black oxide at the final oxidizing temperature of the plates.

The convection-currents of preheated air materially contribute to the fast heating of the copper plates, after the charge has first been placed in the furnace, and we also preferably utilize more electrical energy in the radiant heaters 28, 29 and 30, than is required to just barely supply enough heat to finally bring the copper plates up to the oxidizing temperature. We thus introduce heat into the plates at a rapid rate, so that the plates are brought up to approximately their final temperature within about two minutes after the charge has been placed in the furnace, after which the electrical input into the furnace must be reduced in order to maintain the plates at substantially the required temperature for the remainder of the time of the charge within the furnace.

When we speak of the temperatures within the high-temperature furnace or oxidizing chamber 23, we refer to the average temperature-conditions as best as they can be measured by a pyrometer or pyrometers placed in the air-stream at points chosen as judiciously as possible so as to measure the real air-temperatures without too much radiation from the heaters or any other surfaces within the chamber. It is quite possible that all of the copper surfaces may not quite reach the temperatures which are thus measured, but nevertheless the above-mentioned measurements are the best indication which we have available, to determine the copper-temperatures, and when we speak of temperatures, we refer to temperatures measured or estimated in this way.

The time of the charge within the oxidizing furnace 23 depends upon the thickness of the oxide film, which is desired. The object is to achieve, in the final product, a red-oxide film which is as thin as is compatible with obtaining only a reasonably small number of imperfect plates which must be discarded, in the manufacturing process, these imperfections resulting from too thin a film of oxide, causing a bare spot which short-circuits the rectifier.

A thin film of the oxide is desirable because of the fact that the red copper-oxide has a higher electrical resistivity than copper, so that the internal resistance of the finished rectifier, in the conducting or forward-current direction, is smaller if the oxide film-thickness is small. As will subsequently be described, the outer, black-oxide film of cupric oxide must be removed after the copper plates are completely oxidized and before assembling the completed rectifier. In the removal of this black-oxide film it inevitably results that a considerable portion of the underlying red-oxide film of cuprous oxide is also removed, so that it is necessary, in the oxidizing furnace, to build up a thicker oxide film than is ultimately required.

We have found that an oxidizing time of ten minutes, at the temperatures previously indicated, is satisfactory for the copper plates exposed in the oxidizing furnace 23, although we believe that this time may be reduced to a still lower value. It will be observed that our process gives us an oxide film of more uniform thickness than has heretofore been possible.

After remaining in the high temperature chamber or oxidizing furnace 23 for ten minutes, or other predetermined time, the heated copper plates next pass on into the intermediate-temperature chamber 24, sometimes somewhat erroneously referred to as an annealing chamber, the object of which is to reduce the temperature of the plates to an intermediate value from which it is desirable to quench the plates. It has previously been known that the ratio of reverse-to-forward resistances is strongly affected by the temperature from which the plates are quenched, and that there is an optimum temperature for this purpose, said optimum lying somewhere within the range of approximately 450° to 650° C.

According to our invention, we carry out this intermediate-temperature heat-treatment stage of the operation, in a more advantageous manner, in that we provide a copious circulation of gas within our intermediate-temperature chamber 24. We provide for this gas-circulation by means of a fan or fans 48, which cause a rapid recirculation of the air in the intermediate-temperature chamber 24, resulting not only in a more rapid cooling of the plates from the oxidizing temperature to the intermediate temperature, but also resulting in a far greater uniformity in the rate at which all of the different portions of the electrode-surface change their temperature, in this intermediate-temperature chamber. We believe that our more rapid cooling of the plates, in the intermediate-temperature chamber, contributes materially to the better oxide coating which we obtain, our coating being more uniform and also far less brittle, than the oxide coatings previously attainable, it being possible to even slightly bend our finished oxidized plates, without damaging the oxide film, whereas heretofore the oxide films have been of a fragile glass-like nature which required extremely careful handling.

The construction of our intermediate-temperature chamber is shown in Figs. 5 and 7, except that the exact details of the driving-means for the fans 48 are not shown. The structural arrangements of the particular embodiment of the intermediate-temperature chamber shown in Figs. 5 and 7 constitute the subject of an application of Willard Roth, Serial No. 247,168, filed December 22, 1938, and assigned to the Westinghouse Electric & Manufacturing Company.

An essential feature of the intermediate-temperature chamber 24, according to our invention, is that means shall be provided for subjecting this chamber to the influence of a cooling agency, represented by a water jacket 50 disposed along each of the side-walls of the intermediate-temperature chamber 24, for the purpose of increasing the rapidity with which the temperature of the charge is reduced during the first one or two or three minutes after it enters the intermediate-temperature chamber. Some means must be provided, in the intermediate-temperature chamber, for maintaining the temperature of the charge at an approximately constant value after it has reached approximately this value, so that the operation will be, for the charge to be rapidly reduced in temperature from the vicinity of 1025° C. to the vicinity of 550° C., and thereafter held at approximately this temperature of 550°

C. for the remainder of the ten-minute stay of the intermediate-temperature chamber 24.

In the particular embodiment of the intermediate temperature chamber as shown in Figs. 5 and 7, two alternative paths are provided for the recirculated air, by means of a baffle or partition 51 of insulating material placed in spaced relation to each of the water-cooled walls 50, each baffle 51 being provided at its bottom, with a damper 52 which can be positioned so as to cause the recirculated air to pass either on the outside of these insulating partitions 51, or causing it to pass on the inside thereof. When the air passes outside of the partitions 51, it passes between these partitions and the water jackets 50, so that the air is cooled; and when it passes on the inside of the partitions it is kept away from the water jackets 50 and hence is not subjected to such cooling.

Preferably the active space within the intermediate-temperature chamber 24, that is, the space within which the charge is placed, is bounded by a baffle or shield 53 whereby the air from the fan or fans 48 is directed downwardly over the oxidized plates 10, after which the air passes outwardly or to the sides, at the bottom, and returns to the top of the chamber on either the inside or the outside of the insulating baffles 51, depending upon the position of the dampers 52. From the top of the chamber, the air is drawn into the suction side of the fan 48 and recirculated. Somewhere, in the air stream, it is desirable to provide electrical heaters 54 which are shown underneath the charge 10, so that the air passes over these heaters 54 before spreading outwardly and passing up alongside of the baffles 51. It is usually desirable for suitable automatic means to be provided for controlling the positions of the dampers 52 and the energization of the electrical heaters 54, as is indicated by dotted lines connected to a temperature-responsive means 55 shown in the upper portion of the intermediate-temperature chamber 24.

Inasmuch as the temperature of the oxidized copper plates 10 is rapidly reduced, in the intermediate-temperature chamber 24, and inasmuch as the rate of oxidation is dependent upon a high power of the absolute temperature, possibly of the order of the 12th power, the amount of oxidation produced in the intermediate-temperature chamber is quite limited. Theoretically, we believe that there should be no oxidation in this chamber, as what little oxidation there is will probably result in a somewhat thicker outer film of the black cupric oxide. We have not found it necessary, however, to take precautions that the recirculated gas within the intermediate-temperature chamber shall be of a non-oxidizing nature, except, of course, that we do not supply this chamber with fresh air, and we utilize a closed chamber, with a front door 27 and a back door 57 (Fig. 5), both normally closed while the charge is being treated in this chamber. We contemplate, within the spirit of our invention, that the gas within the intermediate-temperature chamber either may contain some oxygen or may be substantially free of oxygen.

When we speak of temperatures within the intermediate-temperature chamber, we speak, again, of the temperature of the recirculated air or gas within this chamber, measuring this temperature at some point removed from the heaters 54 and also from the water jackets 50. Actually we measure the temperature of the air in the upper central portion of the chamber before it is directed downwardly over the charge 10.

Immediately after the charge is first placed in the intermediate-temperature chamber 24, it is impossible, at first, with the cooling facilities which we have utilized, to make the recirculated air quite as cool as 550° C., but after the first one or two or three minutes, this recirculated air reaches the temperature of 550° C., after which the dampers 52 and heaters 54 are so manipulated that the air-temperature is held substantially constant, at approximately this value, during the remainder of the time of the charge in the intermediate-temperature furnace. It is probable that the temperature of the charge 10 never quite reaches as low a temperature as the temperature indicated for the recirculating air or gas, although it is believed that the temperature of the plates certainly approximates this value, and when we refer to the temperature-conditions within the intermediate-temperature chamber, we refer to the same as measured or estimated in the manner just described.

After the charge has remained in the intermediate-temperature chamber for ten minutes or other predetermined time, it passes on into the quenching chamber 25, in which the charge is quenched in water. This quenching may be obtained either, as heretofore customary, by dipping the oxidized copper plates 10 in water, or, as illustrated, by copiously spraying the plates by means of a water-spray 58.

The progress of the charges or batches of copper plates 10 through the furnace is preferably automatically controlled by means of a timer 22, the preferred operation being somewhat as follows. The endless chain or conveyor 21 is normally stationary, and the three doors 26, 27 and 57 are normally closed, thereby closing the high temperature chamber 23 and the intermediate-temperature chamber 24. These two chambers are normally operated so as to maintain their temperatures as nearly constant as possible, and air is normally supplied to the high-temperature chamber 23 by means of the pump 35 as previously described.

At ten-minute intervals, or at other predetermined times, the timer 22 momentarily operates, and when it does, it causes the following operations. The three doors 26, 27 and 57 begin to open, and as soon as they have begun to open, the forced air-supply to the oxidizing chamber is interrupted, as is symbolized by a control of the air-valve 37, although other control-means may be utilized as will be obvious. When the air-pressure within the oxidizing chamber 23 drops down to the normal atmospheric pressure, the biased damper 46 in the air-outlet closes itself, so as to prevent unnecessary cooling of the furnace by the escape of hot air therefrom. When the doors 26, 27 and 56 are fully open, the endless conveyor 21 is started, preferably gently so as not to cause the suspended copper plates 10 to sway against each other, and the different batches or charges of copper plates 10 are each advanced on up, within the treating equipment consisting of the high-temperature chamber 23, the intermediate-temperature chamber 24 and the quenching chamber 25. Thus, a new charge, which has been placed in readiness to the left of the oxidizing furnace 23 as shown in Fig. 5, is advanced into the oxidizing chamber 23, the charge which was previously in the oxidizing chamber is advanced into the intermediate-temperature chamber 24, the charge which was previously in the intermediate-temperature chamber is advanced into the quenching chamber 25, and the charge which was previously in the quenching chamber 25 is advanced onto a table or shoulder 56, where it can be handled by the workmen. After the charges have thus been advanced, the endless conveyor 21 is stopped, the doors 26, 27 and 57 are closed, and the air-supply to the oxidizing chamber is restored, after which the timer 22 remains quiescent until the expiration of the next ten minutes or other predetermined period.

After the completely oxidized copper plates 10 leave the quenching chamber 25, they are preferably taken next to a grinding wheel 61, as indicated diagrammatically in Fig. 8, where the oxide coatings are ground off of the tabs 11, as indicated at 62 in Fig. 9, exposing the mother-copper of the tabs.

After the grinding operation 61, we prefer to remove the black-oxide coating of cupric oxide from the oxidized copper plates. This may be done, either mechanically, by means of a grinding operation, or chemically, by means of chemicals which remove the black oxide while doing a minimum amount of damage to the red oxide. For this purpose, chemical dips, either in sodium cyanide or in an acid or acids, or other chemical reagents may be utilized.

In the particular embodiment of our invention illustrated in Fig. 8, we prefer to utilize a dip 63 in 2% sulphuric acid, indicated in the drawing as $H_2SO_4$, followed by a water-rinse 64. The sulphuric acid dissolves both the black oxide and the red oxide, but the electrode is not left in the acid long enough to dissolve all of the red oxide, but all of the black oxide layer. The sulphuric-acid dip 63 also leaves a thin film of the appearance of reduced copper, which is partially removed by the water-rinse 64, and the electrode is then cleaned off by a very brief dip 65 in very dilute nitric acid, indicated as $HNO_3$, quickly followed by a water rinse 66. The nitric-acid dip is made as brief as possible in order to minimize damage to the red oxide underlying the black-oxide coating.

Following the chemical removal of the black-oxide coating, it is quite essential, according to our invention, that the oxidized copper plates shall be again cleansed with distilled water, indicated symbolically by a dip 67 in $H_2O$. This again leaves the plates fresh and clean, without any residual deposits from the salts contained in ordinary tap water. After the distilled-water dip, the plates are dried in a dryer 68 preferably consisting of a hot-air blast, after which the plates are ready for the final step in their treatment.

The final step in the treatment of the plates consists in coating the two red-oxide surfaces of each plate in a graphite coater 69, which may be a printing machine or other coating means, whereby the plates are treated with a coating of a finely divided conducting material in a liquid vehicle, by liquid vehicle meaning to include also semi-liquid vehicles. Such a material may be finely divided carbon or graphite suspended in water, or other similar means. This graphite coating 70 is applied to all of the red-oxide coating 71 except for a narrow rim 72 of perhaps ⅛ inch in width all around each coated surface, the object of this uncoated rim being to prevent leakage of electrical current around the edges of the oxidized copper plates. It is desirable to prevent this rim-leakage, not only from the standpoint of reducing the amount of current-flow in the negative or non-conducting direction, but also because the oxide coating has a poorer reverse-to-forward resistance-ratio near the extreme edge-portions than in the center of the plate. Perhaps both forms of statement are statements of the same electrical phenomenon.

While we have described the removal of both of the oxide coatings from the tab 11, as being accomplished by the grinding process 61 before the removal of the black oxide from the rest of the blank, it is possible to perform this grinding operation after the application of the graphite coating 70. The delaying of the grinding operation 61 until after the graphite coating 70 has been applied would have the advantage of facilitating the grinding operation, because the black oxide on the tab 11 would meanwhile have been removed by the acid dips 63 and 65, and the black oxide is much tougher and much harder to grind off, than the red oxide, which could be brushed off relatively easily. And if the grinding operation were thus delayed, the graphite coating 70 would afford the finished plates some protection against damage or adulteration of the red-oxide coating during the grinding of the tabs 11. However, we prefer, as previously indicated, to grind off the tabs 11, with the grinding-wheel 61, before removing the black-oxide film, so that the black-oxide film will absolutely protect the red-oxide coating during the grinding operation.

After the completion of the coated oxidized plate 10 as above described, it is assembled in a rectifier in which a second electrode, which may be a thin flexible sheet 73 of lead, is placed in contact with the graphite coating 70, as shown in Fig. 9. This figure shows a part of a rectifier constructed as described and claimed in a pending application of Frank Conrad, Serial No. 247,193, filed December 22, 1938, assigned to the Westinghouse Electric & Manufacturing Company, in which the flexible foil or sheet 73 of lead is bent around so that a portion of it is pressed against the graphite coating 70 on one side of the oxidized copper plate 10, while another portion is pressed against the corresponding graphite coat on the other side of the plate, so that the lead electrode constitutes a connecting-means connecting both oxides of the oxidized copper plate. To avoid contact between the lead 73 and the ungraphitized edge-portions of the oxidized copper plate 10, these edge-portions may be protected by tape 74. The whole structure is then mechanically pressed together, so that the lead electrodes 73 are in good mechanical and electrical contact with the conducting graphite coating 70 on each of the red-oxide surfaces 71, the whole being assembled with one or more end-plates 75.

As also indicated in Fig. 9, the rectifier is utilized by connecting the exposed copper of the tab 11 as one terminal of the rectifier, and the lead electrode 73 or end-plate 75, as the other electrode, the rectifier being illustrated, by way of example, as charging a storage battery 76 from any suitable alternating-current source 77.

While we have described and illustrated a preferred process and preferred apparatus for carrying out our invention, we desire it to be understood that such description and illustration are intended to be only by way of illustration and not in every sense by way of limitation, as various features of our invention can obviously be carried out in other ways. We desire, therefore, that the appended claims shall be accorded the broadest construction consistent with their language and the prior art.

We claim as our invention:

1. A method of preparing oxidized copper-electrode material for a copper-oxide rectifier, comprising heating the initially substantially unoxidized copper-electrode material to a suitable oxidizing temperature in an oxidizing chamber, conditioning air to remove solid particles and condensable vapors therefrom, furnishing a controlled supply of such conditioned air to said oxidizing chamber in a quantity more than sufficient to supply the oxygen required to suitably oxidize the surface of said electrode-material, and preheating said controlled supply of conditioned air to substantially said oxidizing temperature before admitting the same to the space occupied by the electrode-material being oxidized.

2. A method of preparing oxidized copper-electrode material for a copper-oxide rectifier, comprising heating the initially substantially unoxidized copper-electrode material to a suitable oxidizing temperature in an oxidizing chamber, conditioning air to remove sulphur therefrom, furnishing a controlled supply of such conditioned air to said oxidizing chamber in a quantity more than sufficient to supply the oxygen required to suitably oxidize the surface of said electrode-material, and preheating said controlled supply of conditioned air to substantially said oxidizing temperature before admitting the same to the space occupied by the electrode-material being oxidized.

3. A method of preparing oxidized copper-electrode material for a copper-oxide rectifier, comprising heating the initially substantially unoxidized copper-electrode material to a suitable oxidizing temperature in an oxidizing chamber, passing air through first a dehumidifier and then an activated-charcoal chamber to condition the air, furnishing a controlled supply of such conditioned air to said oxidizing chamber in a quantity more than sufficient to supply the oxygen required to suitably oxidize the surface of said electrode-material, and preheating said controlled supply of conditioned air to substantially said oxidizing temperature before admitting the same to the space occupied by the electrode-material being oxidized.

4. A method of preparing oxidized copper-electrode material for a copper-oxide rectifier, comprising heating the initially substantially unoxidized copper-electrode material to a suitable oxidizing temperature in an oxidizing chamber, furnishing a controlled supply of an oxygen-containing gas to said oxidizing chamber in a quantity more than sufficient to supply the oxygen required to suitably oxidize the surface of said electrode-material, and preheating said oxygen-containing gas to substantially said oxidizing temperature before admitting the same to the space occupied by the electrode-material being oxidized.

5. A method of preparing oxidized copper-electrode material for a copper-oxide rectifier, comprising heating the initially substantially unoxidized copper-electrode material to a suitable oxidizing temperature in an oxidizing chamber, furnishing a controlled supply of a gas containing available oxygen and substantially no other active ingredient capable of causing a reaction upon the copper, causing a copious flow of said controlled supply of gas to said oxidizing chamber in a quantity much more than sufficient to supply the oxygen required to suitably oxidize the surface of said electrode-material, and keeping up the movement of said gas throughout the oxidizing process.

6. A method of preparing oxidized copper-electrode material for a copper-oxide rectifier, comprising heating the initially substantially unoxidized copper-electrode material to a suitable oxidizing temperature for a predetermined time in an oxidizing chamber, and furnishing a controlled supply of air, under pressure, to said oxidizing chamber, at a rate exceeding 5 cc. of air per minute per square centimeter of the oxidized surface of the copper-electrode material in the oxidizing chamber.

7. A method of preparing oxidized copper-electrode material for a copper-oxide rectifier, comprising heating the initially substantially unoxidized copper-electrode material to a suitable oxidizing temperature for a predetermined time in an oxidizing chamber, and furnishing a controlled supply of air, under pressure, to said oxidizing chamber, at a rate sufficient to maintain an average oxygen-to-nitrogen ratio in the oxidizing chamber equal to at least eighty per cent of the normal atmospheric oxygen-to-nitrogen ratio.

8. A method of preparing oxidized copper-electrode material for a copper-oxide rectifier, comprising heating the initially substantially unoxidized copper-electrode material to a suitable oxidizing temperature for a predetermined time in an oxidizing chamber, furnishing a controlled supply of air, under pressure, to said oxidizing chamber, at a rate exceeding 5 cc. of air per minute per square centimeter of the oxidized surface of the copper-electrode material in the oxidizing chamber, and preheating said air to substantially said oxidizing temperature before admitting the same to the space occupied by the electrode-material being oxidized.

9. A method of preparing oxidized copper-electrode material for a copper-oxide rectifier, comprising heating the initially substantially unoxidized copper-electrode material to a suitable oxidizing temperature for a predetermined time in an oxidizing chamber, furnishing a controlled supply of air, under pressure, to said oxidizing chamber, at a rate sufficient to maintain an average oxygen-to-nitrogen ratio in the oxidizing chamber equal to at least eighty per cent of the normal atmospheric oxygen-to-nitrogen ratio, and preheating said air to substantially said oxidizing temperature before admitting the same to the space occupied by the electrode-material being oxidized.

10. A method of preparing oxidized copper-electrode material for a copper-oxide rectifier, comprising heating the initially substantially unoxidized copper-electrode material to an oxidizing temperature of the order of 1025° C., or higher, for a predetermined time, in an oxidizing chamber, furnishing a controlled supply of a moving oxygen-containing gas to said oxidizing chamber in a quantity more than sufficient to supply the oxygen required to suitably oxidize the surface of said electrode-material, and preheating said oxygen-containing gas to substantially said oxidizing temperature before admitting the same to the space occupied by the electrode-material being oxidized.

11. A method of preparing oxidized copper-electrode material for a copper-oxide rectifier, comprising heating the initially substantially unoxidized copper-electrode material to a suitable oxidizing temperature, for a predetermined time, in an oxidizing chamber, and causing said electrode-material to be bathed in a copious supply of moving air, heated to a temperature of the order of 1025° C., or higher during its entire time in said oxidizing chamber.

12. A method of preparing oxidized copper-electrode material for a copper-oxide rectifier, comprising causing the initially substantially unoxidized copper-electrode material to be subjected to a moving supply of a heated oxygen-supplying gas under conditions causing said electrode-material to be quickly heated to a temperature of the order of 1020° C., or more, and maintained at substantially that temperature for a predetermined length of time, immediately thereafter causing said heated electrode-material to be subjected to a moving cooling gas under conditions causing said electrode-material to be partially cooled to a predetermined intermediate temperature, and subsequently causing said electrode-material to be quenched from substantially said predetermined intermediate temperature.

13. In combination, a high-temperature chamber, an intermediate-temperature chamber adjacent to said high-temperature chamber, a quenching chamber adjacent to said intermediate-temperature chamber, heating means and means for producing a moving supply of a heated oxygen-supplying gas for said high-temperature chamber, cooling means and means for causing a movement of a cooling gas in said intermediate-temperature chamber, quenching means in said quenching chamber, and conveyor-means for causing material to enter said high-temperature chamber, to subsequently pass substantially directly from said high-temperature chamber to said intermediate-temperature chamber, and to subsequently pass substantially directly from said intermediate-temperature chamber to said quenching chamber.

14. In combination, a high-temperature chamber, an intermediate-temperature chamber adjacent to said high-temperature chamber, a quenching chamber adjacent to said intermediate-temperature chamber, heating-means for said high-temperature chamber, cooling means for said intermediate-temperature chamber, quenching means in said quenching chamber, and conveyor-means for causing material to enter said high-temperature chamber, to subsequently pass substantially directly from said high-temperature chamber to said intermediate-temperature chamber, and to subsequently pass substantially directly from said intermediate-temperature chamber to said quenching chamber.

15. A batch-type machine as defined in claim 13, including an entrance-closure-means for said high-temperature chamber, an exit-closure-means for said intermediate-temperature chamber, and an intermediate closure-means between said high-temperature and intermediate-temperature chambers, said conveyor-means being of the endless-chain type, and intermittently operating means for momentarily causing said several closure-means to open, said moving supply of heated oxygen-supplying gas to be materially reduced, and said endless conveyor to move, to cause the treated material to move in batches through the machine.

16. A batch-type machine as defined in claim 14, including an entrance-closure-means for said high-temperature chamber, an exit-closure-means for said intermediate-temperature chamber, and an intermediate closure-means between said high-temperature and intermediate-temperature chambers, said conveyor-means being of the endless-chain type, and intermittently operating means for momentarily causing said several closure-means to open and said endless conveyor to move, to cause the treated material to move in batches through the machine.

17. A method of preparing oxidized copper-electrode material for a copper-oxide rectifier, comprising causing the initially substantially unoxidized copper-electrode material to be oxidized at a temperature of the order of 1020° C., or more, immediately thereafter causing said heated electrode-material to be subjected to a controlled, predetermined, moving cooling gas under conditions causing said electrode-material to be partially cooled to a controlled, predetermined intermediate temperature, and subsequently causing said electrode-material to be quenched from substantially said predetermined intermediate temperature.

18. In combination, means for causing initially substantially unoxidized copper-electrode material to be oxidized at a temperature of the order of 1020° C., or more, predeterminedly-controlled means for immediately thereafter causing said heated electrode-material to be subjected to a moving cooling gas under conditions causing said electrode-material to be partially cooled to a predetermined intermediate temperature, and means for subsequently causing said electrode-material to be quenched from substantially said predetermined intermediate temperature.

19. A method of preparing oxidized copper-electrode material for a copper-oxide rectifier, comprising causing the initially substantially unoxidized copper-electrode material to be oxidized at a temperature of the order of 1020° C., or more, immediately thereafter causing said heated electrode-material to be bathed in copious quantities of a moving cooled gas for a time, thereafter causing said electrode-material to be bathed in copious quantities of a moving gas maintained at a substantially constant predetermined temperature until the expiration of a predetermined time, and subsequently causing said electrode-material to be quenched from substantially said predetermined intermediate temperature.

20. In combination, means for causing initially substantially unoxidized copper-electrode material to be oxidized at a temperature of the order of 1020° C., or more, means for immediately thereafter causing said heated electrode-material to be bathed in copious quantities of a moving cooled gas for a time, means for thereafter causing said electrode-material to be bathed in copious quantities of a moving gas maintained at a substantially constant predetermined temperature until the expiration of a predetermined time, and means for subsequently causing said electrode-material to be quenched from substantially said predetermined intermediate temperature.

21. An oxidizing-furnace mechanism, comprising means for providing a heat-insulated chamber, controllable heating-means therefor, and predeterminedly controlled means for producing a copious predetermined, briskly moving supply of heated oxygen-supplying gas in the active space within said chamber and for maintaining said movement of the oxygen-supplying gas substantially throughout the oxidizing process.

22. A method of preparing oxidized copper-electrode material for a copper-oxide rectifier, comprising heating the initially substantially unoxidized copper-electrode material to a suitable oxidizing temperature for a predetermined time in an oxidizing chamber, immediately thereafter treating said heated material for a predetermined time in a substantially closed intermediate-temperature chamber, causing a rapid recirculation of a gaseous medium at a controlled rate within said intermediate-temperature chamber, and immediately after treatment in said intermediate-temperature chamber quenching said treated material.

23. A method of preparing oxidized copper-electrode material for a copper-oxide rectifier, comprising heating the initially substantially unoxidized copper-electrode material to a suitable oxidizing temperature for a predetermined time in an oxidizing chamber, immediately thereafter treating said heated material for a predetermined time in a substantially closed intermediate-temperature chamber having cooling means associated therewith, causing a rapid recirculation of a gaseous medium at a controlled rate within said intermediate-temperature chamber in heat-exchanging relation to said cooling means, and immediately after treatment in said intermediate-temperature chamber quenching said treated material.

24. A method of preparing oxidized copper-electrode material for a copper-oxide rectifier, comprising heating the initially substantially unoxidized copper-electrode material to a suitable oxidizing temperature for a predetermined time in an oxidizing chamber, immediately thereafter treating said heated material for a predetermined time in a substantially closed intermediate-temperature chamber having cooling means associated therewith, for a time causing a rapid recirculation of a gaseous medium at a controlled rate within said intermediate-temperature chamber in heat-exchanging relation to said cooling means, for a time causing a rapid recirculation of a gaseous medium at a controlled rate and at a substantially constant predetermined temperature within said intermediate-temperature chamber, and immediately after treatment in said intermediate-temperature chamber quenching said treated material.

25. A method of preparing oxidized copper-electrode material for a copper-oxide rectifier, comprising heating the initially substantially unoxidized copper-electrode material to a suitable oxidizing temperature for a predetermined time in an oxidizing chamber, immediately thereafter treating said heated material for a predetermined time in a substantially closed intermediate-temperature chamber, for a time causing a rapid recirculation of a gaseous medium at a controlled rate and at a substantially constant predetermined temperature within said intermediate-temperature chamber, and immediately after treatment in said intermediate-temperature quenching said treated material.

26. A method of preparing oxidized copper-electrode material for a copper-oxide rectifier, comprising heating the initially substantially unoxidized copper-electrode material to a suitable oxidizing temperature for a predetermined time in an oxidizing chamber, immediately thereafter treating said heated material for a predetermined time in a substantially closed intermediate-temperature chamber, causing a rapid recirculation of a gaseous medium at a controlled rate within said intermediate-temperature chamber, causing the temperature of the electrode-material to be reduced to substantially a predetermined intermediate temperature while in said intermediate-temperature chamber, and subsequently causing said electrode-material to be quenched from substantially said predetermined intermediate temperature.

27. A method of preparing oxidized copper-electrode material for a copper-oxide rectifier, comprising cleaning a sheet of annealed copper with one or more solutions of cleansing agents, subsequently rinsing it with distilled water, subsequently rerolling the treated sheet so as to slightly reduce its thickness, and subsequently oxidizing the copper.

28. A method of preparing oxidized copper-electrode material for a copper-oxide rectifier, comprising cleaning a sheet of copper with one or more solutions of cleansing agents, subsequently rinsing it with distilled water, subsequently rerolling the treated sheet so as to slightly reduce its thickness, subsequently punching a plurality of blanks from said sheet, subsequently cleaning the blanks with one or more solutions of cleansing agents, then rinsing them with distilled water, then drying them, then oxidizing them.

FRANK CONRAD.
EARL D. WILSON.
CARL C. HEIN.
FLOYD T. HAGUE.